US010059001B2

(12) United States Patent
Miyazawa et al.

(10) Patent No.: US 10,059,001 B2
(45) Date of Patent: Aug. 28, 2018

(54) ROBOT CONTROL DEVICE, ROBOT SYSTEM, AND ROBOT

(71) Applicant: Seiko Epson Corporation, Tokyo (JP)

(72) Inventors: Hiroshi Miyazawa, Tatsuno (JP); Yukihiro Yamaguchi, Matsumoto (JP); Nobuhiro Karito, Kiso (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/527,106

(22) Filed: Oct. 29, 2014

(65) Prior Publication Data

US 2015/0120055 A1 Apr. 30, 2015

(30) Foreign Application Priority Data

Oct. 31, 2013 (JP) .................................. 2013-226556

(51) Int. Cl.
*B25J 9/16* (2006.01)
*B25J 19/04* (2006.01)
(Continued)

(52) U.S. Cl.
CPC ... *B25J 9/1697* (2013.01); *G05B 2219/39016* (2013.01); *G05B 2219/39391* (2013.01);
(Continued)

(58) Field of Classification Search
CPC ...... B25J 9/1641; B25J 9/1692; B25J 9/1697; G05B 19/401; G05B 2219/37009;
(Continued)

(56) References Cited

U.S. PATENT DOCUMENTS 4,532,757 A * 8/1985 Tutle ..................... A01D 46/24
382/110
6,278,906 B1 * 8/2001 Piepmeier .............. B25J 9/1607
700/245
(Continued)

FOREIGN PATENT DOCUMENTS

JP 07-195287 A 8/1995
JP 09-311712 A 12/1997
(Continued)

OTHER PUBLICATIONS

Lang, H.; de Silva, CW. (2015) Visual Servo Systems for Mobile Robots. In Mechatronics. CRC Press.*
(Continued)

*Primary Examiner* — Dale Moyer
(74) *Attorney, Agent, or Firm* — Harness, Dickey & Pierce, P.L.C.

(57) ABSTRACT

An image acquisition unit acquires an image including an object, and a controller starts a visual servo using the acquired image, on the basis of at least one of an error in calibration, an error in installation of a robot, an error resulting from the rigidity of the robot, an error of a position where the robot has gripped the object, an error regarding imaging, and an error regarding a work environment. Additionally, the controller starts the visual servo when the distance between one point of a working unit of the robot and the object is equal to or greater than 2 mm.

6 Claims, 8 Drawing Sheets

(51) Int. Cl.
  *B25J 13/08* (2006.01)
  *B25J 18/02* (2006.01)
(52) U.S. Cl.
  CPC ... *G05B 2219/39394* (2013.01); *Y10S 901/03* (2013.01); *Y10S 901/47* (2013.01)
(58) Field of Classification Search
  CPC .......... G05B 2219/37423; G05B 2219/39391; G05B 2219/39393; G05B 2219/39394; G05B 2219/39397; G05B 2219/40565; G05B 2219/40607
  USPC ...... 700/245, 254, 259; 901/46, 47; 382/153
  See application file for complete search history.

(56) References Cited

U.S. PATENT DOCUMENTS

| | | | |
|---|---|---|---|
| 8,600,552 B2 | 12/2013 | Nakajima et al. | |
| 2010/0161125 A1* | 6/2010 | Aoba | B25J 9/1692 700/254 |
| 2011/0046782 A1* | 2/2011 | Fixell | B25J 9/1692 700/251 |
| 2011/0106311 A1 | 5/2011 | Nakajima et al. | |
| 2011/0270444 A1* | 11/2011 | Nagata | G05B 19/401 700/258 |
| 2011/0301758 A1 | 12/2011 | Nakajima et al. | |
| 2012/0004774 A1* | 1/2012 | Umetsu | B25J 5/007 700/254 |
| 2012/0277898 A1* | 11/2012 | Kawai | B25J 5/02 700/114 |
| 2014/0107840 A1 | 4/2014 | Nakajima et al. | |

FOREIGN PATENT DOCUMENTS

| | | |
|---|---|---|
| JP | 2003-211382 A | 7/2003 |
| JP | 2010-137299 A | 6/2010 |
| JP | 2011-093055 A | 5/2011 |

OTHER PUBLICATIONS

Janabi-Sharifi, F. (2002) Feature Selection and Planning for Visual Servoing. In Opt-Mechatronic Systems Handbook. CRC Press.*

Janabi-Sharifi, F. (2002). Visual Servoing: Theory and Applications. In Opto-Mechatronic Systems Handbook. CRC Press.*

Janabi-Sharifi, Farrokh. "Feature Selection and Planning for Visual Servoing." Opto-Mechatronic Systems Handbook: Techniques and Applications. CRC Press, 2002.*

Corke, P. I. (1996). Visual Control of Robots: high-performance visual servoing. Taunton, UK: Research Studies Press. (Year: 1996).*

Extended European Search Report for Application No. EP 14 19 0856 dated Mar. 18, 2015 (8 pages).

* cited by examiner

|  | DISTANCE BETWEEN HAND TIP AND OBJECT | | |
| --- | --- | --- | --- |
|  | - 2mm | 2mm - 300mm | 300mm - |
| COLLISION WITH OBJECT | × | ○ | ○ |
| ERRONEOUS RECOGNITION OF OBJECT | ○ | ○ | × |
| WORKING SPEED OF ROBOT | ○ | ○ | × |

FIG. 5

|  | PLANE ROUGHNESS OF OBJECT | |
| --- | --- | --- |
|  | - 1mm | 1 - 300mm |
| POSITION ERROR OF HAND | ○ | × |

FIG. 6

|  | SIMPLE CALIBRATION | PRECISION CALIBRATION |
| --- | --- | --- |
| CALIBRATION PRECISION | WITHIN ±2 mm | WITHIN ±0.2 mm |
| WORKING HOUR | TOTAL OF ABOUT 20 MINUTES | TOTAL OF ABOUT 4 HOURS |
|  | ROBOT CALIBRATION: ABOUT 10 MINUTES VISION CALIBRATION: ABOUT 10 MINUTES | ROBOT CALIBRATION: ABOUT 3 HOURS VISION CALIBRATION: ABOUT 1 HOUR |

ROBOT CONTROL DEVICE, ROBOT SYSTEM, AND ROBOT

BACKGROUND

1. Technical Field

The present invention relates to a robot control device, a robot system, and a robot.

2. Related Art

In working sites for manufacturing or the like, multiaxial robots have been used for work, such as assembly, inspection, or the like of products, and work traditionally performed by human hands has been automated. When components, such as hands constituting parts of the robots, are actuated, the position and posture thereof requires precision according to the respective work. Thus, calibration is performed in advance in a work environment to acquire the position of a reference point. In the related art, the calibration is strictly performed primarily by human hands. For example, in order to secure a precision of 0.02 mm, several hours to more than a day have been spent only for the calibration.

Here, the work as described in JP-A-2011-93055 and JP-A-2010-137299 is performed after the calibration is strictly performed.

For example, JP-A-2011-93055 describes an information processing method of moving a manipulator up to an object at a high speed, with high precision, and stably as a control system. In this method, when no object is detected, a teaching playback control (position control) for moving the manipulator along a path to a target position that is set in advance on the basis of the position of the object is executed, and when the object is detected, a teaching playback control for setting a new path, using a position closer to the object than the target position as a new target position and for moving the manipulator in accordance with the new path until switching conditions for switching movement control are satisfied is executed. When the switching conditions are satisfied, a vision servo control (visual servo) is executed.

Additionally, for example, JP-A-2010-137299 describes a control method of an assembly working robot that can prevent a workpiece from being caught during a searching motion and can insert the workpiece into an insertion position of an object even if there is an irregular portion on the edge of the insertion position. The control method of the assembly working robot described in JP-A-2010-137299 moves the workpieces on the object in a state where the workpiece gripped by the robot is pressed against the object, and searches for the insertion position provided on the object, inserts the workpiece into the insertion position, and lifts a workpiece end in a searching traveling direction and inclines the workpiece at a preset inclination angle with respect to the object, when the insertion position is searched for.

However, when the calibration is not performed or when the calibration performed is insufficient, in the methods described in JP-A-2011-93055 and JP-A-2010-137299, precision is not secured due to a position and a posture in which the robot is installed, as well as other factors. Therefore, there is a concern that a hand that grips the object comes into contact with the object unintentionally or the object or the hand itself is damaged.

SUMMARY

An advantage of some aspects of the invention is to provide a robot control device, a robot system, and a robot that can reduce unintended contact with an object or a concern that the object or a hand is damaged even if a burden related to calibration is alleviated.

(1) An aspect of the invention is directed to a robot control device including an image acquisition unit that acquires an image including an object; and a controller that starts a visual servo on the basis of at least one of an error in calibration, an error in installation of a robot, an error resulting from the rigidity of the robot, an error of a position where the robot has gripped an object, an error regarding imaging, and an error regarding a work environment.

According to this configuration, since the timing at which the visual servo control is started in accordance with an error is determined, occurrence of unintended contact with the object or a concern that the object or the hand is damaged can be reduced even if a burden related to the calibration is alleviated.

(2) Another aspect of the invention is directed to the robot control device according to the aspect of the invention described above, wherein the work environment is illuminance showing the brightness of the object.

According to this configuration, occurrence of unintended contact with an object or a concern that the object or the hand is damaged can be reduced in accordance with the illuminance of the object.

(3) Another aspect of the invention is directed to a robot control device including an image acquisition unit that acquires an image including an object; and a controller that starts a visual servo when the distance between a terminal point of a working unit of a robot and the object is equal to or greater than 2 mm.

According to this configuration, since the visual servo control is started when the distance from the object is equal to or greater than 2 mm even if an error of 2 mm occurs, occurrence of unintended collision with the object or a concern that the object or the hand is damaged can be reduced.

(4) Another aspect of the invention is directed to the robot control device according to the aspect of the invention described above, wherein the controller starts the visual servo when the distance is from 2 mm to 300 mm.

According to this configuration, control failure can be prevented by avoiding erroneous recognition of the object, and the work speed of the robot to be controlled can be secured.

(5) Another aspect of the invention is directed to the robot control device according to the aspect of the invention described above, wherein the visual servo is a control of making the image acquisition unit image the object multiple times while the robot moves from a first posture to a second posture different from the first posture.

According to this configuration, the object can be moved to a target position in consideration of a time change in the position or posture of the object.

(6) Another aspect of the invention is directed to a robot control device including a controller that brings one point of a working unit provided with a force detection unit that detects a force into contact with an object, and determines a position where one point of the working unit has come into contact with the object as a reference point of one point of the working unit.

According to this configuration, the position where the object and the terminal point of the working unit of the robot have come into contact with each other is determined as the reference point when the position or posture of the working unit is controlled, without depending on any human hand. Therefore, the efficiency of work related to the calibration can be increased.

(7) Another aspect of the invention is directed to a robot control device including a controller that brings one point of a working unit provided with a force detection unit that detects a force into contact with an object having a plane roughness of 1 mm or less, and determines a position where one point of the working unit has come into contact with the object as a reference point of one point of the working unit.

According to this configuration, the position where the object and the terminal point of the working unit of the robot have come into contact with each other is determined as the reference point when the position or posture of the working unit is controlled, without depending on any human hand. Therefore, the efficiency of work related to the calibration can be increased. Additionally, the reference point can be acquired with a precision equal to or smaller than 2 mm by making the plane roughness be equal to or smaller than 1 mm.

(8) Another aspect of the invention is directed to the robot control device according to the aspect of the invention described above, wherein one point of the working unit is located closer to a tip of the working unit than the force detection unit.

According to this configuration, since the force acting when the working unit has come into contact with the object does not act on the working unit itself directly, the force detection unit can effectively detect the force when the object has come into contact with one point of the working unit.

(9) Another aspect of the invention is directed to the robot control device according to the aspect of the invention described above, wherein, when one point of the working unit is brought into contact with the object, the controller moves one point of the working unit in a direction perpendicular to a horizontal plane, and determines a coordinate value, in the perpendicular direction, of the position where one point of the working unit has come into contact with the object as a coordinate value of the reference point in the perpendicular direction.

According to this configuration, since the coordinate value of the reference point in the direction perpendicular to the horizontal plane from the reference point is determined without depending on any human hand, the efficiency of work related to the calibration can be increased.

(10) Another aspect of the invention is directed to the robot control device according to the aspect of the invention described above, wherein, when one point of the working unit is brought into contact with the object, the controller moves one point of the working unit in a direction parallel to the horizontal plane, and determines a coordinate value, in the parallel direction, of the position where one point of the working unit has come into contact with the object as a coordinate value of the reference point in the parallel direction.

According to this configuration, since the coordinate value of the reference point in the direction parallel to the horizontal plane from the reference point is determined without depending on any human hand, the efficiency of work related to the calibration can be increased.

(11) Another aspect of the invention is directed to the robot control device according to the aspect of the invention described above, wherein the controller controls the motion of the robot, using a relative position from the determined reference point.

According to this configuration, the errors caused by the work environment or the like can be reduced or solved by controlling the working unit of the robot depending on the relative position to the reference point.

(12) Another aspect of the invention is directed to a robot system including a robot having a working unit; and a robot control device. The robot control device includes an image acquisition unit that acquires an image including an object, and a controller that starts a visual servo on the basis of at least one of an error in calibration, an error in installation of the robot, an error resulting from the rigidity of the robot, an error of a position where the robot has gripped the object, an error regarding imaging, and an error regarding a work environment.

According to this configuration, since the timing at which the visual servo control is started in accordance with an error is determined, occurrence of unintended contact with the object or a concern that the object or the hand is damaged can be reduced even if a burden related to the calibration is alleviated.

(13) Another aspect of the invention is directed to a robot system including a robot having a working unit; and a robot control device. The robot control device includes an image acquisition unit that acquires an image including an object, and a controller that starts a visual servo when the distance between one point of the working unit of the robot and the object is equal to or greater than 2 mm.

According to this configuration, since the visual servo control is started when the distance from the object is equal to or greater than 2 mm even if an error of 2 mm occurs, occurrence of unintended collision with the object or a concern that the object or the hand is damaged can be reduced.

(14) Another aspect of the invention is directed to a robot system including a robot having a working unit; and a robot control device. The robot control device includes a controller that brings one point of the working unit provided with a force detection unit that detects a force into contact with an object, and determines a position where one point of the working unit has come into contact with the object as a reference point of one point of the working unit.

According to this configuration, the position where the object and the terminal point of the working unit of the robot have come into contact with each other is determined as the reference point when the position or posture of the working unit is controlled, without depending on any human hand. Therefore, the efficiency of work related to the calibration can be increased.

(15) Another aspect of the invention is directed to a robot system including a robot having a working unit; and a robot control device. The robot control device includes a controller that brings one point of the working unit provided with a force detection unit that detects a force into contact with an object having a plane roughness of 1 mm or less, and determines a position where one point of the working unit has come into contact with the object as a reference point of one point of the working unit.

According to this configuration, the position where the object and the terminal point of the working unit of the robot have come into contact with each other is determined as the reference point when the position or posture of the working unit is controlled, without depending on any human hand. Therefore, the efficiency of work related to the calibration can be increased. Additionally, the reference point can be acquired with a precision equal to or smaller than 2 mm by making the plane roughness be equal to or smaller than 1 mm.

(16) Another aspect of the invention is directed to a robot including a working unit; an image acquisition unit that acquires an image including an object; and a controller that starts a visual servo on the basis of at least one of an error in calibration, an error in installation, an error resulting from rigidity, an error of a position where the object has been gripped, an error regarding imaging, and an error regarding a work environment.

According to this configuration, since the timing at which the visual servo control is started in accordance with an error is determined, occurrence of unintended contact with the object or a concern that the object or the hand is damaged can be reduced even if a burden related to the calibration is alleviated.

(17) Another aspect of the invention is directed to a robot including a working unit; an image acquisition unit that acquires an image including an object; and a controller that starts a visual servo when the distance between one point of the working unit and the object is equal to or greater than 2 mm.

According to this configuration, since the timing at which the visual servo control is started is determined even if an error of 2 mm occurs, unintended collision with the object or a concern that the object or the hand is damaged can be reduced.

(18) Another aspect of the invention is directed to a robot including a working unit and a force detection unit that detects a force acting on the working unit; and a controller that brings one point of the working unit into contact with an object, and determines a position where one point of the working unit has come into contact with the object as a reference point of one point of the working unit.

According to this configuration, the position where the object and the terminal point of the working unit of the robot have come into contact with each other is determined as the reference point when the position or posture of the working unit is controlled, without depending on any human hand. Therefore, the efficiency of work related to the calibration can be increased.

(19) Another aspect of the invention is directed to a robot including a working unit; a force detection unit that detects a force acting on the working unit; and a controller that brings one point of the working unit into contact with an object having a plane roughness of 1 mm or less, and determines a position where one point of the working unit has come into contact with the object as a reference point of one point of the working unit.

According to this configuration, the position where the object and the terminal point of the working unit of the robot have come into contact with each other is determined as the reference point when the position or posture of the working unit is controlled, without depending on any human hand. Therefore, the efficiency of work related to the calibration can be increased. Additionally, the reference point can be acquired with a precision equal to or smaller than 2 mm by making the plane roughness be equal to or smaller than 1 mm.

BRIEF DESCRIPTION OF THE DRAWINGS

The invention will be described with reference to the accompanying drawings, wherein like numbers reference like elements.

FIG. 5 is a table illustrating an example of conditions that a control method is switched to a visual servo control.

FIG. 6 is a table illustrating an example of the relationship between the plane roughness of an object and the magnitude of a position error, which is used in calibration processing according to the present embodiment.

DESCRIPTION OF EXEMPLARY EMBODIMENTS

Figure 1:
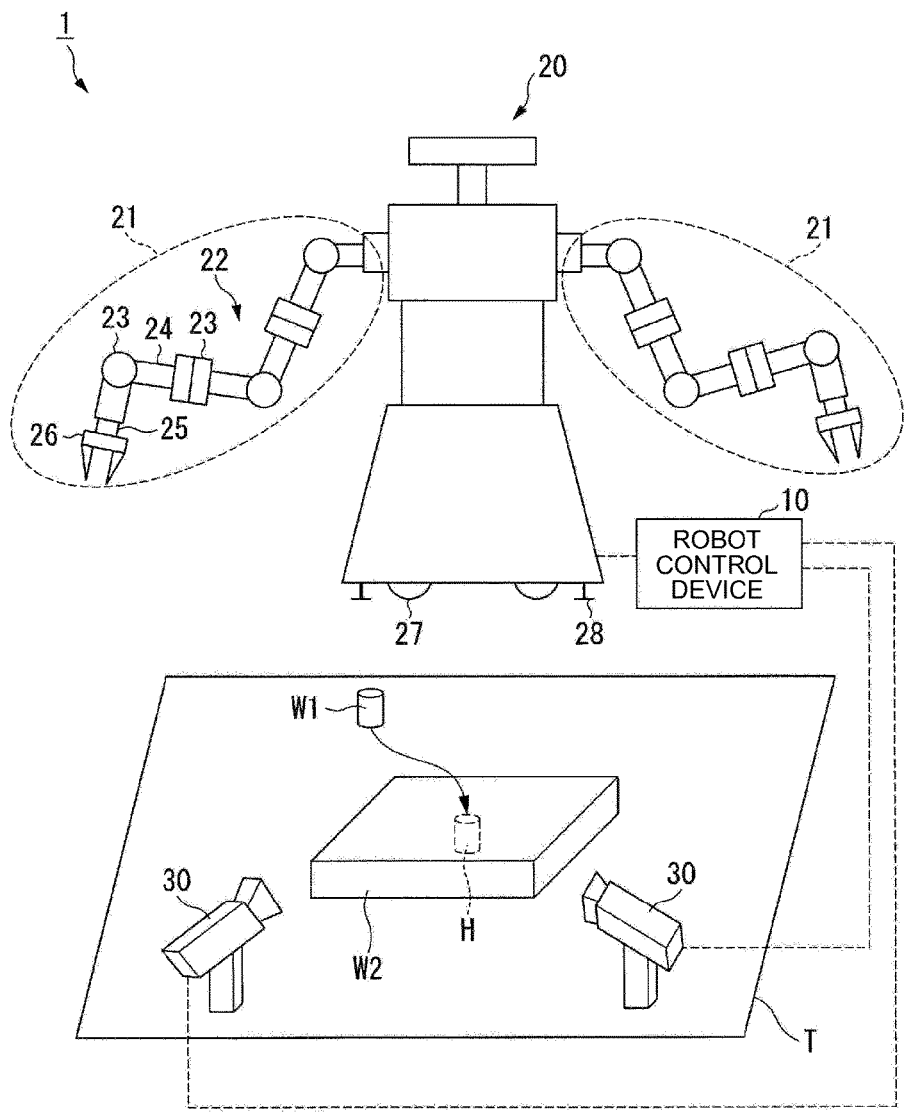
FIG. 1 is a schematic view of a robot system according to the present embodiment.

Hereinafter, embodiments of the invention will be described referring to the drawings.

FIG. 1 is a schematic view of a robot system 1 according to the present embodiment.

The robot system 1 includes a robot control device 10, a robot 20, and one or a plurality of (two in this example) imaging devices 30. The robot control device 10 is connected to the robot 20 and each imaging device 30 so as to be communicable therewith.

The robot control device 10 controls the motion of the robot 20. The robot control device 10, for example, performs the control of acquiring image data showing images including an object serving as a work object of the robot 20 from the imaging device 30, and starting a visual servo based on the acquired images to bring the position of the object close to a target position. The conditions under which the visual servo is started can be set in advance on the basis of at least one of an error in calibration, an error in installation of the robot 20, an error resulting from the rigidity of the robot 20, an error of a position where the robot 20 has gripped an object, an error regarding imaging, and an error regarding a work environment. The condition under which the visual servo is started is also, for example, when a relative distance between one point of a working unit 21 (to be described below) of the robot 20 and the object is 2 mm or greater. The visual servo is a control technique of measuring a change in a position relative to a target as visual information, and using the measured visual information as feedback information to thereby track the target.

In the visual servo, respective items of the image data captured multiple times by the imaging device 30 are used as visual information. For example, the image data captured at predetermined time intervals (for example, 30 ms) in the imaging device 30 is used. That is, the visual servo, more specifically controls the motion of the robot 20 so that the position of an object shown by a current image including an object that is currently captured approaches the position of an object shown by a target image. The target image is an image including an object arranged at the target position as a target. In other words, the visual servo is the control of moving an object to the target position, using images acquired multiple times by an image acquisition unit. Additionally, the visual servo may also include the control of making the image acquisition unit (for example, the imaging device 30 or an image acquisition unit 140 (to be described below)) image the object multiple times while the robot moves from a first posture to a second posture different from the first posture.

Additionally, the robot control device 10 detects a force acting on the working unit 21 of the robot 20, and brings one point of the working unit 21 close to an object serving as a work object of the robot 20 or any one of objects that are present in a predetermined range from the object until one point of the working unit comes into contact therewith, on the basis of the detected force (per degree). Then, the robot control device 10 determines a point where one point of the working unit 21 and its object has come into contact with each other as a reference point. Thereafter, the robot control device 10 controls the robot 20, specifically the position or posture of the working unit 21, using a relative position from the reference point. An object coming into contact with one point of the working unit 21 or any one of objects that are present in a predetermined range from the object is an object with a smooth surface, for example, an object having a plane roughness of 1 mm or smaller than 1 mm. The configuration of the robot control device 10 will be described below.

The robot 20 operates according to a control signal from the robot control device 10, and performs work. Although the work contents of the robot 20 are not particularly limited, for example, the work contents correspond to the work of fitting an object 1 serving as a work object on a work bench T into a hole H made in an object W2. The object is also referred to as a workpiece.

The robot 20 has one or a plurality of (two in this example) arms 22, a hand 26 provided at a tip portion of each arm 22, and a force sensor 25 provided at a wrist portion of each arm 22. The wrist portion of the arm 22 is a portion between the tip portion of the arm 22 and the hand 26. The arm 22 is configured to include one or a plurality (six on each of the left and the right in this example) joints 23, or one or a plurality of (five on each of the left and the right in this example) links 24.

The force sensor 25, for example, detects a force or moment acting on the hand 26. The force sensor 25 outputs a sensor value showing the detected force or moment to the robot control device 10. The sensor value, for example, is used for the impedance control of the robot 20 in the robot control device 10. The force sensor 25 is, for example, a hexaxial force sensor. The hexaxial force sensor is a sensor that can simultaneously detect six components including force components in three translation axis directions and moment components around three rotation axes. The three translation axes are, for example, three coordinate axes (an X-axis, a Y-axis, and a Z-axis) that form a three-dimensional rectangular coordinate system and that are orthogonal to each other. The three rotation axes are, for example, three coordinate axes, respectively. The number of components detected by the force sensor 25 may be, for example, three components (triaxial force sensor) without being limited to the six components. In addition, the force sensor 25 is also referred to as a force detection unit 25.

The hand 26 includes, for example, at least two fingered components. The fingered components are referred to as fingers. The hand 26 can grip an object (for example, W1 or W2) using the fingers. The hand 26 may be attachable to and detachable from a tip portion of the arm 22. The hand 26 can be referred to as a kind of an end effector. That is, the robot 20 may include other types of end effectors than the hand 26 instead of the hand 26 or together with the hand 26. The end effector is a member that performs various operations, such as gripping, lifting, hoisting, suctioning, and machining an object. The end effector can take various forms, such as a hand hook and a suction disk. Additionally, the number of end effectors provided for one per arm 22 is not limited one, and two or more end effectors may be provided for one arm.

A unit including the arm 22, the force sensor 25, and the hand 26 form the working unit 21, and is also referred to a manipulator. The working unit 21 is a part that operates in order for the robot 20 to perform ordered predetermined work. In the example illustrated in FIG. 1, the robot 20 has two working units 21. Each working unit 21 includes a drive unit, for example, an actuator, (not shown) for actuating respective portions, such as the joint 23 and the hand 26. The actuator includes, for example, a servo motor, an encoder, or the like. The encoder detects and encodes displacement so as to be converted into an encoder value, and outputs the converted encoder value to the robot control device 10. The encoder value is used for feedback control or the like for the robot 20 in the robot control device 10. In addition, the working unit 21 may not be constituted as a manipulator as long as the working unit is a part that operates in order to perform predetermined work, and may be, for example, the arm 22 as a single body, the hand 26 as a single body, or a combination thereof with the force sensor 25.

The robot 20 drives the respective joints 23 in an interlocking manner according to a control instruction input from the robot control device 10. Accordingly, the robot control device 10 can move an attention position set in advance at the tip portion of the arm 22 or the like to a desired position within a predetermined movable range, or can direct the attention position in a desired direction. This attention position is referred to as a terminal point. The terminal point is also referred to as an end point and is installed closer to a tip than the force detection unit 25 in the working unit 21. The robot control device 10 can grip or release an object or the like, for example, by driving the hand 26 or the arm 22 constituting the working unit 21, using the terminal point as one point of the above-described working unit 21.

In addition, one point of the working unit 21 may be, for example, a tip portion of an end effector, such as the hand 26, without being limited to the tip portion of the arm 22. Additionally, one point of the above-described working unit 21 is not limited to the terminal point as long as one point can be used as a key for control of the working unit 21. For example, one point may be a portion (bellies) that comes into contact with an object W21 when the finger portions that form the hand 26 grip the object W21, or a tip of any finger portion of a plurality of finger portions. In the following, it should be noted that a case where the "one point" of the working unit 21 is usually the "terminal point" is taken as an example.

The error in the position of the terminal point of the working unit 21 also originates from the rigidity of the robot 20. For example, the double-arm robot 20 including two working units 21 is used to perform multifunctional work, and is used to execute or assist various kinds of work in a factory or other business places. Since the robot is close to human beings or other articles, a housing or a skeleton is formed of a member (for example, a stainless steel material with a small diameter) having a relatively low rigidity in order to reduce any damage if there is any contact or collision with the human beings or other articles. Therefore, when an external force is applied to the robot 20, "deflection" becomes great, which causes degradation of precision. That is, as the rigidity of the robot 20 is lower, the postures change easily according to gravity or external force that has acted on the working unit 21, and the number of errors increases.

The error in the position of the terminal point of the working unit 21 also originates from the installation of the robot 20. Here, the robot 20 has a plurality of casters 27 and fixed legs (adjustment feet) 28 on a bottom surface thereof. The casters 27 and the fixed legs 28 are fixed to a carriage (not shown) arranged on the bottom surface of the robot 20. The casters 27 and the fixed legs 28 are attached to a movable frame (not shown) that is liftably supported by a lower portion of the carriage. As one of two pedals (not shown) attached to the movable frame is stepped on, the casters 27 fall below the fixed legs 28. In this case, by applying an external force to the robot 20, wheels that form the casters 27 become rotatable and movable. Additionally, as the other of the two pedals is stepped on, the fixed legs 28 fall below the casters 27. In this case, although the position of the robot 20 is simply fixed, positional deviation occurs as the working unit 21 operates. Therefore, there is a tendency that the error of the position becomes greater than that when the working unit is fixed to be close with bolts or the like.

Accordingly, in such a configuration, while the robot is moved to different work environments and easily used, this causes an installation error to reoccur. Therefore, it is necessary to frequently perform calibration.

In the present embodiment, execution of the calibration is urged by alleviating a burden related to the calibration. Additionally, as will be described below, the visual servo is started based on conditions determined according to the error of installation of the robot 20 and the error resulting from the rigidity of the robot 20. Accordingly, a concern about unintended contact with an object or damage of an object or a hand can be reduced by ensuring precision.

The imaging device 30 captures an image representing a work area of the robot 20, and generates image data showing the captured image. The work area of the robot 20, in the example illustrated in FIG. 1, is a three-dimensional space that is a range in which the working unit 21 can perform work on the work bench T, and a region including one point of the working unit 21. The two imaging devices 30 arranged at positions different from each other are directed to the hole H made in the object W2, on the work bench T. Each imaging device 30 is, for example, a visible light camera, an infrared camera, or the like. The imaging device 30 outputs the generated image data to the robot control device 10.

The configuration of the above-described robot system 1 is merely an example for describing the outline of the present embodiment. That is, the configuration of the above-described robot system 1 may take other configurations without being limited to the above-described configuration.

For example, although FIG. 1 illustrates an example in which the number of joints 23 (the number of axes) is six (six axes) on each of the left and the right side, the number of joints 23 may be less than six on each side, or may be more than six on each side. The number of the links 24 is determined according to the number of the joints 23. Additionally, the shape, size, arrangement, and structure of members, such as the joints 23, the links 24, and the hand 26, may be appropriately changed.

Additionally, the installation position of the imaging device 30 may be on a ceiling or a wall surface without being limited to being on the work bench T as illustrated in FIG. 1. Additionally, the imaging device 30 may be provided at the tip portion of the arm 22, a trunk portion, a head, or the like instead of or in addition to the above installation position of the imaging device 30. Additionally, the imaging device 30 may be connected to the robot 20 instead of the robot control device 10. In that case, the image data generated by the imaging device 30 is input to the robot control device 10 via the robot 20. Additionally, the robot control device 10 may be built into the robot 20 and integrated with the robot 20.

Next, an example of the work environment in which the robot 20 performs work will be described.

Figure 2:
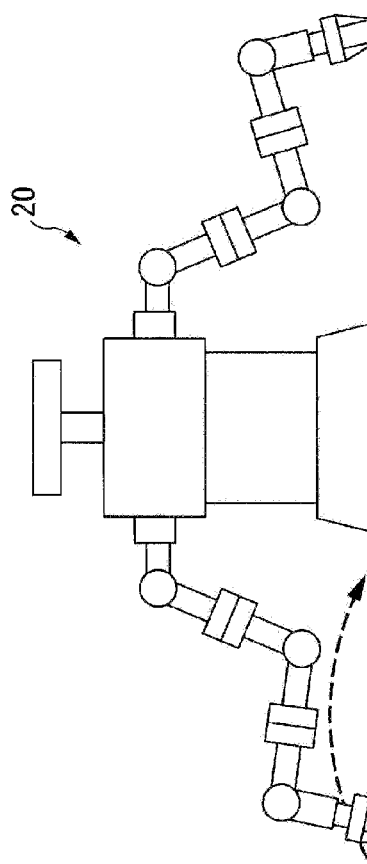
FIG. 2 is a schematic view illustrating an example of a work environment.
Figure 2:
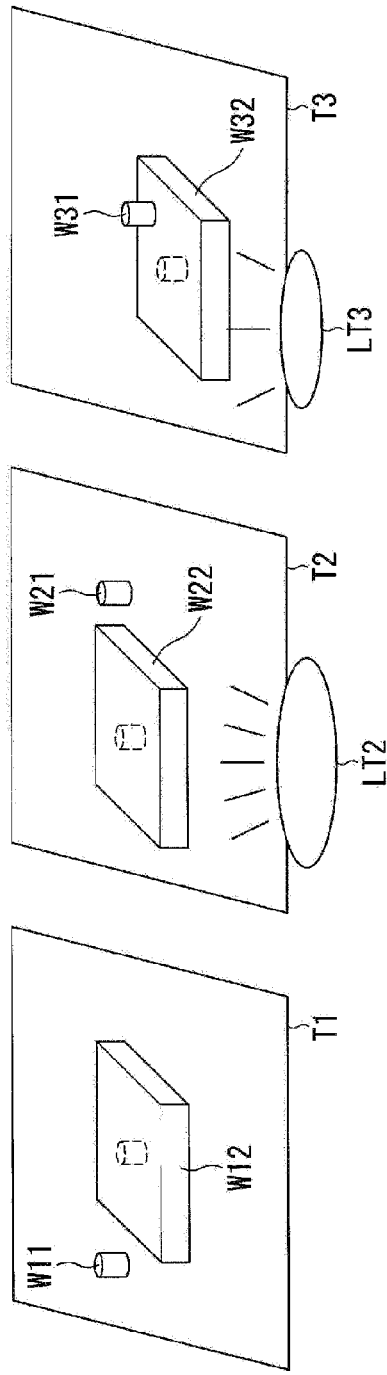

FIG. 2 is a schematic view illustrating the example of the work environment.

FIG. 2 illustrates an example of three kinds of work environments. Three work benches T1 to T3 are installed at different positions, respectively, and every two objects W11 and W12 and the like are arranged in different positional relationships on the work bench T1 and the like, respectively. These work environments are work environments for performing fitting work, respectively. The fitting work is the work of inserting the object W11 into a hole H made in the object W12. When calibration is not performed or when the precision is insufficient even if the calibration is performed, the object W11 may be conveyed to a position distant from the hole H, and not only work may fail, but also the object W11 is damaged.

Since a main factor and its degree of a control error change depending on a work environment, it is important to perform calibration before the robot 20 changes the work environment to start new work. There are, for example, illuminance, the reflectivity of an object, and a positional relationship between objects in the elements of the work environment. In the example illustrated in FIG. 2, the presence/absence of installation of an illumination light LT2 or the like near the work bench T2 and the quantity of light influence the illuminance. Additionally, coloring, irregularities, or the like given to the surfaces of the objects W11, W21, and W31 influence the reflectivity. Since an image showing a work area including an object is used when the visual servo is used for the control of the robot 20, the illuminance and the reflectivity of an object cause an error in addition to the positional relationship between objects.

Although the example illustrated in FIG. 2 illustrates a case where fitting work is performed in one room, desirable illuminance changes greatly depending on the type of work or the place where work is done. For example, according to the illuminance criteria of the office specified in JIS (Japanese Industrial Standards) 291110, for example, the illuminance is 750 to 1500 (lux), in offices, design rooms, and drafting rooms where a fine visual task is performed, the luminance is 300 to 750 (lux) in offices, executive rooms, conference rooms, printing rooms, computer rooms, control rooms, or consultation rooms other than the above, and the luminance is 150 to 300 (lux) in warehouses, electric rooms, machine rooms, and coarse work rooms.

Additionally, the resolution, installation position, direction, imaging interval (frame interval), or the like of the imaging device 30 influences the recognition precision of an object, and become an error factor regarding imaging.

In addition, an error occurs in the position or posture of the terminal point of the working unit 21 that grips the object W11 or the like, and the magnitude of the error varies whenever the object W11 or the like is gripped. Therefore, even in the same work environment, variation occurs in a position where the working unit 21 has gripped the object W11 or the like. In the visual servo, if controlling the motion of the working unit 21 on the basis of an image showing a terminal point arranged at this varied position is taken into consideration, the error of the position where the working unit 21 has gripped the object W11 or the like also becomes an error factor of the position of the terminal point of the working unit 21 that is controlled on the basis of this error.

As illustrated in FIG. 2, if it is considered that the robot 20 is made to perform work in a state where an object is arranged at the front of one (for example, the work bench T2) of the work benches T1 to T3, an installation error caused by movement occurs. Therefore, it is necessary to perform the calibration in advance to solve or reduce the error factors before the robot is made to perform work in each work environment. Since work environments may vary depending on work performed, particularly when various kinds of items are produced in small quantities, it is important to perform the calibration quickly before each respective work. In the present embodiment, the calibration can be performed in a shorter time than before as described below.

Figure 3:
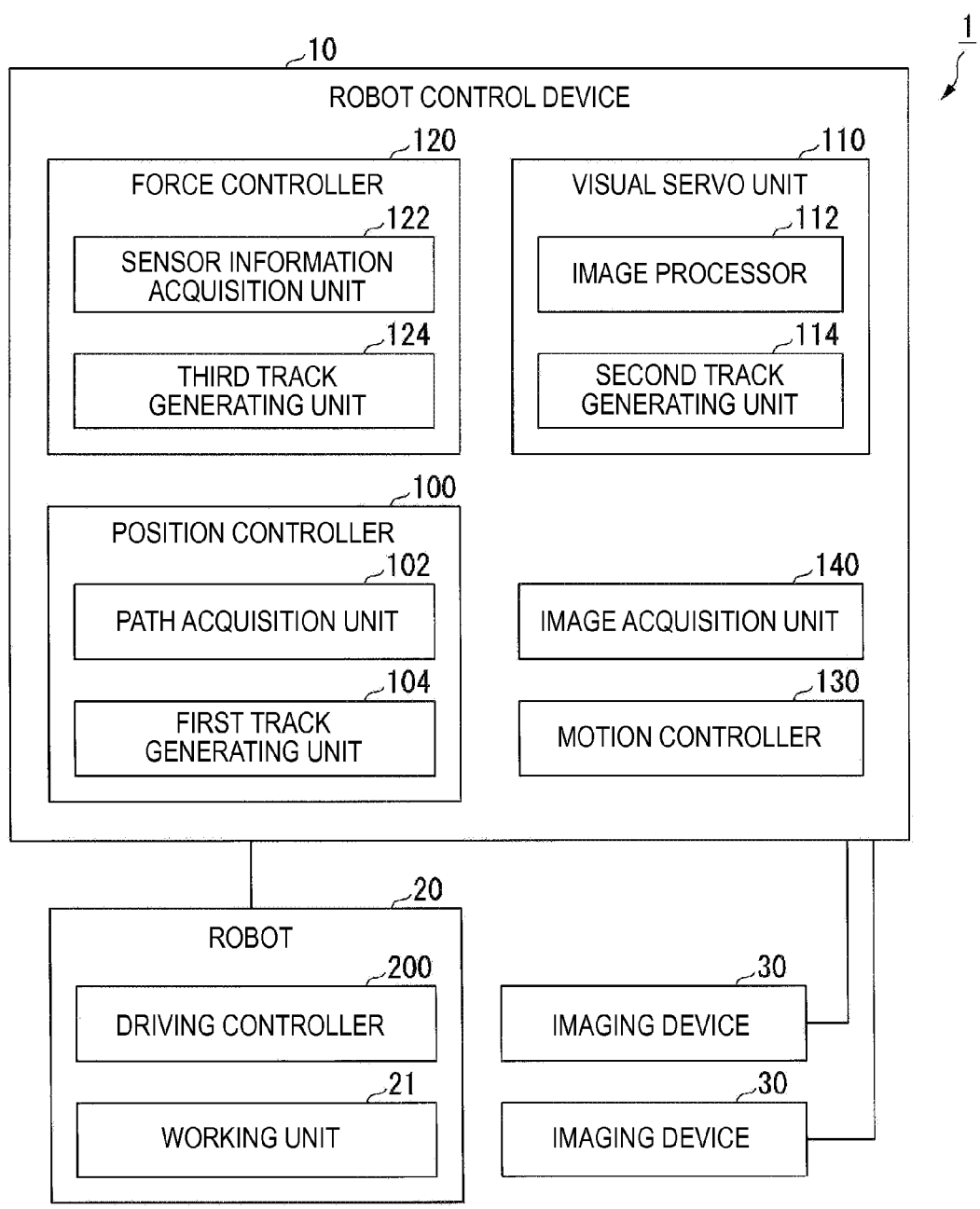
FIG. 3 is a block diagram illustrating a functional configuration of a robot system according to the present embodiment.

FIG. 3 is a block diagram illustrating a functional configuration of the robot system 1 according to the present embodiment.

The robot 20 has a driving controller 200. The driving controller 200 drives an actuator so that the position of one point, for example, the terminal point, of the working unit 21 becomes a target position indicated by a control signal, on the basis of the control signal input from the robot control device 10, and an encoder value acquired by the actuator and a sensor value acquired by the force sensor 25. In addition, the current position of the terminal point can be calculated from the encoder value in the actuator or the like.

The robot control device 10 includes a position controller 100, a visual servo unit 110, a force controller 120, a motion controller 130, and an image acquisition unit 140.

The position controller 100 includes a path acquisition unit 102 and a first track generating unit 104. The visual servo unit 110 includes an image processor 112 and a second track generating unit 114. The force controller 120 includes a sensor information acquisition unit 122 and a third track generating unit 124.

The position controller 100 executes the position control of moving the working unit 21 along with a predetermined path that is set is advance.

The path acquisition unit 102 acquires path information regarding a path. The path is a process formed by connecting one or a plurality of teaching positions, which are set in advance by teaching, in a preset order. The path information, for example, information showing the coordinates of each teaching position or the order of the teaching position within the path, is stored in a memory 12 (to be described below). The path information stored in the memory 12 may be input via an input device 15 or the like. In addition, information on the final position, that is, a target position of the terminal point is also included as one point of the working unit 21, in the path information.

The first track generating unit 104 sets the next teaching position, that is, the track of the terminal point, on the basis of the information on the current position acquired from the driving controller 200 and the path acquired by the path acquisition unit 102.

Additionally, the first track generating unit 104 determines the position of the arm 22 to be moved next on the basis of the track of the set terminal point, that is, the target angle of the actuator provided at each joint 23. Additionally, the first track generating unit 104 generates a command value so as to move the arm 22 by the target angle, and outputs the command value to the motion controller 130. In addition, since the processing performed by the first track generating unit 104 includes general contents, the detailed description thereof will be omitted.

The visual servo unit 110 acquires the image captured by the imaging device 30 via the image acquisition unit 140. Additionally, the visual servo unit 110 starts the visual servo to move the arm 22, on the basis of the acquired image. In addition, in the present embodiment, for example, a position base method of controlling the robot on the basis of three-dimensional position information on an object calculated using methods, such as a stereogram that uses two sheets of images between which parallax occurs, and makes the image recognize as a solid is adopted as the visual servo. In addition, an image base method of controlling the robot on the basis of the amount of a characteristic extracted from the target image and the amount of a characteristic extracted from the current image may be adopted as the visual servo. Additionally, as the visual servo, pattern matching may be performed on the current image and the target image, an object collated with the object shown by the target image may be recognized from the current image, and the position or posture of the object may be specified on the basis of the position or posture indicated by the recognized object.

The image processor 112 recognizes the terminal point from the image data acquired from the image acquisition unit 140, and extracts an image including the recognized terminal point. The target image including the terminal point that is present at the target position may be acquired in advance and stored in a storage unit, such as the memory 12. The image processor 112 recognizes the current position of the terminal point from the current image extracted at that point in time, recognizes the target position of the terminal point from the target image, and outputs the recognized current position and target position to the second track generating unit 114. Additionally, the image processor 112 calculates a distance from the recognized current position to the target position, and outputs the calculated distance to the motion controller 130. In addition, since well-known processing can be used as the image recognition processing performed by the image processor 112, the detailed description thereof will be omitted.

The second track generating unit 114 sets the track of the terminal point, that is, the movement distance and movement direction of the terminal point, on the basis of the current position and the target position recognized by the image processor 112.

Additionally, the second track generating unit 114 determines the target angle of each actuator provided at each joint 23 on the basis of the movement distance and movement direction of the terminal point that are set. Moreover, the second track generating unit 114 generates a command value so as to move the arm 22 by the target angle, and outputs the command value to the motion controller 130. In addition, since various general techniques can be used as the generation processing for the track, the determination processing of the target angle, the generation processing of the command value, and the like that are performed by the second track generating unit 114, the detailed description thereof will be omitted.

The force controller 120 performs a force control (also referred to as force sense control), on the basis of sensor information (a sensor value showing force information or moment information) obtained from the force sensor 25 of the robot 20. In the present embodiment, impedance control is performed as the force control. The impedance control is a technique of controlling a position and a force for setting mechanical impedance (inertia, a damping coefficient, rigidity) generated when a force is applied to a finger (hand 26 or the like) of the robot from outside, to a value suited to intended target work. Specifically, the impedance control is, for example, a control of making the hand come into contact with an object with a mass, a coefficient of viscosity, and an elastic modulus that are set as targets, in a model in which the mass, a coefficient of viscosity, and an elastic element are connected to an end effector portion of robot 20.

In addition, in order to perform the force control, it is necessary to detect the force or the moment that is applied to the end effector, such as the hand 26. However, the method of detecting the force or the moment applied to the end effector, is not limited to the method using the force sensor. For example, an external force exerted on the end effector can also be estimated from each output torque value of the arm 22. Accordingly, in order to perform the force control, the arm 22 may have means for acquiring a force that is directly or indirectly applied to the end effector.

The sensor information acquisition unit 122 acquires sensor information (the detected sensor value or the like) output from the force sensor 25 of the robot 20. In addition, the sensor information acquisition unit 122 may also be referred to as a force detection unit.

The third track generating unit 124 determines the movement direction and movement distance of the terminal point through the impedance control. Additionally, the third track generating unit 124 determines the target angle of each actuator provided at each joint 23, on the basis of the movement direction and movement distance of the terminal point. Additionally, the third track generating unit 124 generates a command value so as to move the arm 22 by the target angle, and outputs the command value to the motion controller 130. In addition, since various general techniques can be used as the generation processing of the track, the determination processing of the target angle, the generation processing of the command value, and the like that are performed by the third track generating unit 124, the detailed description thereof will be omitted.

In addition, in the robot 20 with joints, if the angle of each joint is determined, the position of the terminal point is uniquely determined by forward kinematic processing. That is, in an N joint robot, one target position can be expressed by N joint angles. Therefore, if a set of the N target joint angles is assumed as one target joint angle, then the track of the terminal point can be considered to be a group of the target joint angles. Hence, the command values output from the first track generating unit 104, the second track generating unit 114, and the third track generating unit 124 may be values (target position) regarding positions, or may be values (target angles) regarding the angles of the joints.

The image acquisition unit 140 acquires the image data captured by the imaging device 30, and outputs the acquired image data to the visual servo unit 110 and the motion controller 130.

The motion controller (controller) 130 selects any one of a command value input from the position controller 100, a command value input from the visual servo unit 110, and a command value input from the force controller 120, on the basis of the magnitude of the distance calculated by the second track generating unit 114 and the sensor value input from the force sensor 25. The motion controller 130 outputs a control signal for moving the working unit 21 to the robot 20 on the basis of the selected command value.

Here, the motion controller 130 selects the command value input from the visual servo unit 110 on the basis of at least one of the error of the calibration, the error of installation of the robot 20, the error regarding imaging, and the error regarding the work environment. In this case, the motion controller 130 electrically connects a contact point A2 and a contact point B to each other. The conditions under which this command value is selected is, for example, when the distance calculated by the second track generating unit 114, that is, the distance between the terminal point of the working unit 21 of the robot 20 and an object, is equal to or greater than a second distance (for example, 2 mm) and equal to or smaller than a first distance (for example, 300 mm). That is, the visual servo is performed when the distance from an object is equal to or greater than the second distance and equal to or smaller than the first distance. The distance from an object is a distance (shortest distance) that becomes the minimum distance between one point on the surface of the object and the terminal point of the working unit 21.

When the distance calculated by the second track generating unit 114 is greater than the first distance, the motion controller 130 selects the command value input from the position controller 100. In this case, the motion controller 130 electrically connects a contact point A1 and the contact point B to each other. That is, the position control is performed when a relative distance is greater than the first distance.

When the distance calculated by the second track generating unit 114 is smaller than the second distance, the motion controller 130 selects the command value input from the force controller 120. In this case, the motion controller 130 electrically connects a contact point A3 and the contact point B to each other. That is, the force control is performed when the distance is smaller than the second distance.

However, when the calibration is performed, the motion controller 130 temporarily stops the output of the control signal to thereby stop (halt) the motion of the working unit 21 when the distance calculated by the second track generating unit 114 has reached the second distance. Thereafter, the motion controller 130 outputs the command value input from the force controller 120 to the robot 20, thereby resuming the motion of the working unit 21, that is, the terminal point. Here, the motion controller 130 moves the two fingers forming the hand 26 again at a predetermined speed in a predetermined direction in a state where the interval between the fingers is farthest opened from each other. The predetermined speed is a speed that is slow to such a degree that, even if the terminal point and an object or other objects come into contact with each other, the movement of the terminal point immediately is stopped by stopping the output of the control signal without causing mutual damage. The predetermined direction is one direction in the three-dimensional rectangular coordinate system that is a robot coordinate system, for example, a direction (Z direction) perpendicular to a horizontal plane.

The motion controller 130 determines whether or not the terminal point of the work unit comes into contact with an object (for example, the object W11) or any one of objects (for example, the object W21) that are in a predetermined range (for example, a work range). The motion controller 130, for example, determines that there is contact when a change per unit of time in the sensor value input from the force sensor 25 is more rapid than a change (for example, 50 gw/s) of a predetermined sensor value.

When it is determined that there is any contact, the motion controller 130 determines a point where terminal point of the working unit 21 comes into contact with an object or objects that are present within a predetermined range as a reference point, and outputs a reference signal indicating the determined reference point to the first track generating unit 104, the second track generating unit 114, and the third track generating unit 124. Here, the first track generating unit 104, the second track generating unit 114, and the third track generating unit 124, for example, reset a coordinate value, in a predetermined direction (for example, a Z direction), of the reference point indicated by the reference signal input from the motion controller 130, and a coordinate value, in the predetermined direction, of the terminal point of the working unit 21 to be an equal value. Accordingly, the coordinate value in the predetermined direction can be determined (positioned), and the relative coordinate value of the terminal point of the working unit 21 using the reference point as a reference can be acquired.

In addition, by performing a series of processing and motion (hereinafter referred to as calibration processing) including the stoppage of the terminal point of the working unit 21, and the movement, the contact, and the positioning in the robot coordinate system, also in another direction (for example, an X direction and a Y direction), relative coordinate values related to those directions can be acquired.

Thereafter, the motion controller 130 controls the motion of the robot 20 using the relative position from the reference point. Here, the motion controller 130 converts the predetermined target position into the relative coordinate values from the reference point, and controls the position and posture of the working unit 21 so that the terminal point of the working unit 21 is brought close to a position specified by the converted coordinate values. Accordingly, errors accompanying the change in the work environment or the like can be solved or reduced.

Additionally, the precision can be improved by repeating (for example, 6 times) the calibration processing in each direction (for example, Z direction) in the robot coordinate system regarding different coordinates within a plane (for example, an XY plane) perpendicular to the direction. This is because, when coordinate values are different within the plane perpendicular to the direction even if the coordinate values in the direction are the same, the angles, that is, encoder values of the joints 23 forming the working unit 21 may be different from each other, therefore, more reference points are acquired and the reference point is used for control.

After the calibration processing in each direction is performed, the motion controller 130 performs normal work, that is, the control of bringing the terminal point of the working unit 21 close to the target position. The processing performed by the motion controller 130 will be described below in detail.

Next, an example of a flow of control in the robot system 1 according to the present embodiment will be described.

Figure 4:
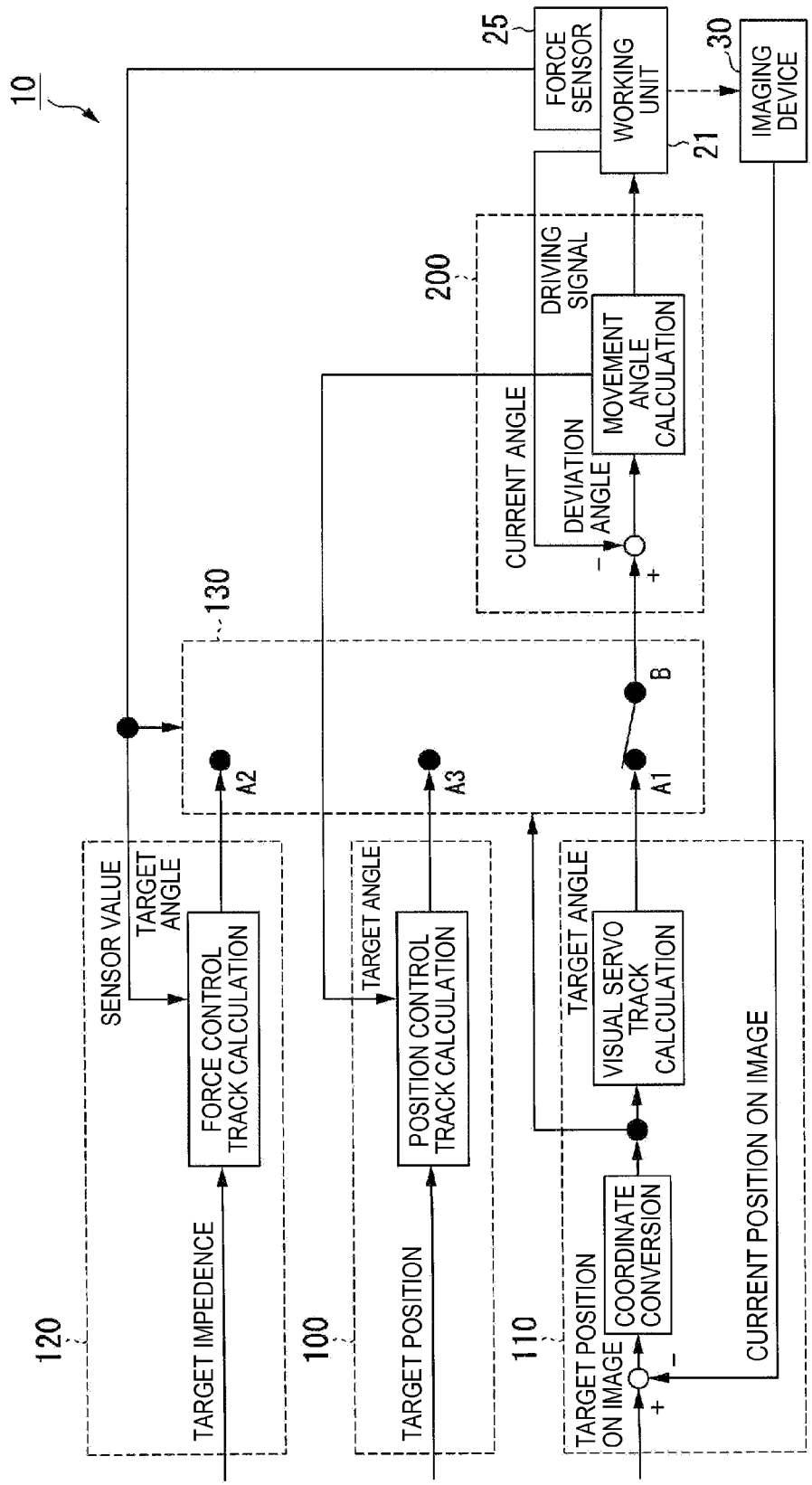
FIG. 4 is a block diagram illustrating an example of a flow of control in the robot system according to the present embodiment.

FIG. 4 is a block diagram illustrating the example of the flow of control in the robot system 1 according to the present embodiment.

In the position controller 100, a feedback loop for bringing each joint 23 of the working unit 21 close to the target angle through the position control reverses. Information on the target position is included in preset path information. The first track generating unit 104 generates a track and a command value (here, a target angle) on the basis of the information on the target position and the current position acquired by the driving controller 200 if the path information is acquired.

In the visual servo unit 110, a visual feedback loop for bringing the current position close to the target position using the image data showing the current image acquired by the imaging device 30 proceeds. The second track generating unit 114 acquires target image data showing the target image as the information on the target position from the memory 12. Additionally, since the current position and the target position are expressed by a coordinate system (image coordinate system) on the image, the current position and the target position are converted into the coordinate system (robot coordinate system) in the robot 20. Additionally, the second track generating unit 114 generates a track and a command value (here, a target angle) on the basis of the current position and the target position after the conversion.

In the force controller 120, a feedback loop for bringing the terminal point of the working unit 21 of the robot 20 with an impedance (target impedance) set as a target into contact with an object on the basis of the sensor value input from the force sensor 25 proceeds. The third track generating unit 124 generates a track and a command value (here, a target angle) so that the input sensor value reaches a target impedance.

The motion controller (controller) 130 selects any one of a command value input from the position controller 100, a command value input from the visual servo unit 110, and a command value input from the force controller 120, on the basis of the magnitude of the distance calculated by the second track generating unit 114 and the sensor value input from the force sensor 25. The motion controller 130 outputs a control signal for moving the working unit 21 to the robot 20 on the basis of the selected command value.

In addition, generally, since the load of image processing is high, the intervals (for example, every 30 milliseconds (msec)) at which the visual servo unit 110 outputs the command value may be longer than the intervals (for example, every 1 millisecond (msec)) at which the position controller 100 or the force controller 120 outputs its command value.

A command value (target angle) is input from the robot control device 10 to the driving controller 200. The driving controller 200 acquires a current angle on the basis of the encoder value of each actuator provided at each joint 23, and calculates a difference (deviation angle) between the target angle and the current angle. Additionally, the driving controller 200 calculates the movement speed of the arm 22 on the basis of the deviation angle, and moves the working unit 21 by the deviation angle according to the calculated movement speed.

As described above, the motion controller 130 controls a timing at which the control method of controlling the position of the working unit 21 is switched to the visual servo, on the basis of threshold values including the first distance and the second distance. These threshold values are determined according to the distance between the terminal point of the working unit 21 and the object, and according to (1) the presence/absence of a possibility of collision with an object, (2) the presence/absence of a possibility that the object is erroneously recognized or recognition thereof fails, and (3) a difference in the speed at which the working unit 21 is actuated.

FIG. 5 is a table illustrating an example of conditions under which the control method is switched to the visual servo.

The respective rows shows (1) the presence/absence (collision with an object) of a possibility of collision with the object, (2) the presence/absence (erroneous recognition of the object) of a possibility that the object is erroneously recognized or recognition thereof fails, and (3) the speed (work speed of the robot) at which the working unit 21 is actuated. The respective columns show the divisions of the distance (distance from the object) between the terminal point of the working unit 21 and the object.

For example, when the distance is smaller than 2 mm, (1) there is a possibility of collision with the object (X), but (2) there is no possibility that the object is erroneously recognized or recognition thereof fails (O), and (3) the speed at which the working unit 21 is actuated can be sufficiently secured (O). For example, when the distance is equal to or greater than 2 mm and equal to or smaller than 300 mm, (1) there is no possibility of collision with the object (O), (2) there is no possibility that the object is erroneously recognized or recognition thereof fails (O), and (3) the speed at which the working unit 21 is actuated can be sufficiently secured (O). For example, when the distance exceeds 300 mm, (1) there is no possibility of collision with the object (O), but (2) there is a possibility that the object is erroneously recognized or recognition thereof fails (X), and (3) the speed at which the working unit 21 is actuated is slow (X).

Accordingly, 2 mm and 300 mm that demarcate the range of a distance where no factors of (1), (2), and (3) become a problem are selected as the first distance and the second distance, respectively.

Additionally, the first distance and the second distance may be determined according to any one of the above-described error factors, that is, the error in installation of the robot 20, the error resulting from the rigidity of the robot 20, the error in the position where the working unit 21 has gripped an object, the error regarding imaging, and the error regarding the work environment, or arbitrary combinations thereof. This is because the error factors influence (1) to (3).

Additionally, the precision of the coordinate values of the robot coordinate system calibrated by performing the above-described calibration processing depends on planar irregularities of an object brought into contact with the terminal point of the working unit 21.

FIG. 6 is a table illustrating an example of the relationship between the plane roughness of an object and the magnitude of a position error, which are used in the calibration processing according to the present embodiment.

Here, the position error (position error of the hand) of the terminal point of the working unit 21 is small (O) when the plane roughness of the object is smaller than 1 mm, and the position error is large (X) when the plane roughness of the object is equal to or greater than 1 mm. Accordingly, in order to secure precision such that the position error of the terminal point of the working unit 21 is equal to or smaller than 2 mm, the plane roughness of the object must be equal to or smaller than 1 mm.

Next, robot control processing according to the present embodiment will be described.

Figure 7:
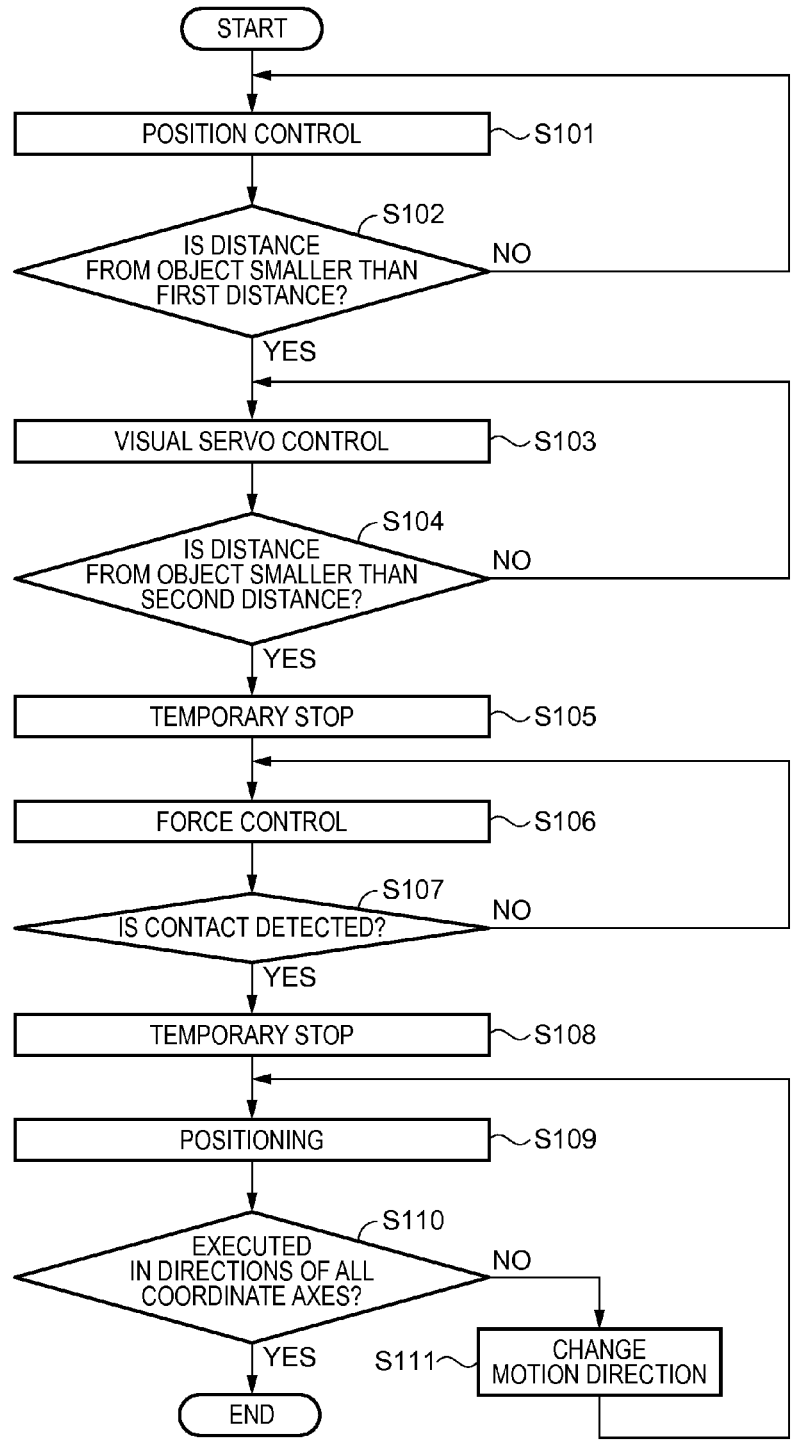
FIG. 7 is a flowchart illustrating robot control processing according to the present embodiment.

FIG. 7 is a flowchart illustrating the robot control processing according to the present embodiment.

In this example, a case where the distance between the target position and the terminal point (starting position) of the working unit 21 at the time of the start of motion is greater than the first distance, the starting position is in the direction of a predetermined coordinate axis (for example, the Z direction) from the target position, and the target position is set to one point on the surface of an object (for example, the object W12) is assumed.

(Step S101) The motion controller 130 performs the position control. Here, the motion controller 130 outputs the control signal indicating the command value input from the position controller 100 to the robot 20. Thereafter, the process proceeds to Step S102.

(Step S102) The motion controller 130 determines whether or not the distance from the object is smaller than the first distance (for example, 300 mm). When the distance is determined not to be smaller (NO in Step S102), Step S101 is repeated. When the distance is determined to be smaller (YES in Step S102), the process proceeds to Step S103.

(Step S103) The motion controller 130 performs the visual servo (control). Here, the motion controller 130 outputs the control signal indicating the command value input from the visual servo unit 110 to the robot 20. Thereafter, the process proceeds to Step S104.

(Step S104) The motion controller 130 determines whether or not the distance from the object is smaller than the second distance (for example, 2 mm). When the distance is determined not to be smaller (NO in Step S104), Step S103 is repeated. When the distance is determined to be smaller (YES in Step S104), the process proceeds to Step S105.

(Step S105) The motion controller 130 temporarily (for example, 1 second) stops the motion of the terminal point of the working unit 21. Thereafter, the process proceeds to Step S106.

(Step S106) The motion controller 130 performs the force control to bring the terminal point of the working unit 21 close to the target again. Here, the motion controller 130 outputs the control signal indicating the command value input from the force controller 120 to the robot 20. Thereafter, the process proceeds to Step S107.

(Step S107) The motion controller 130 detects whether or not the terminal point of the working unit 21 has come into contact with the surface of the object. When the contact is detected (YES in Step S107), the process proceeds to Step S108. When the contact is not detected (NO in Step S107), the process proceeds to Step S106.

(Step S108) The motion controller 130 temporarily stops the motion of the terminal point of the working unit 21. Thereafter, the process proceeds to Step S109.

(Step S109) The motion controller 130 performs the calibration (positioning) of the coordinate values in the direction in which the terminal point of the working unit 21 is actuated in Step S107. Here, the motion controller 130, for example, determines the coordinate values of the point where the terminal point of the working unit has come into contact with the object as the coordinate values of the reference point of the terminal point. Thereafter, the process proceeds to Step S110.

(Step S110) The motion controller 130 determines whether or not the calibration of the coordinate values has been executed in the directions of all the coordinate axes. When the execution is determined to be finished (YES in Step S110), the processing illustrated in FIG. 7 is ended. Thereafter, the motion controller 130 makes the robot 20 perform desired work (for example, fitting work). When it is determined that the execution is not performed in the directions of all the coordinate axes (the X direction, the Y direction, and the Z direction in the case of the three-dimensional rectangular coordinate system) (NO in Step S110), the process proceeds to Step S111.

(Step S111) The motion controller 130 changes the direction of the coordinate axis in which the terminal point of the working unit 21 is actuated to another coordinate direction (for example, from the Z direction to the X direction). Thereafter, the process proceeds to Step S109.

Next, an example of the motion of the hand 26 in the calibration processing will be described.

Figure 8:
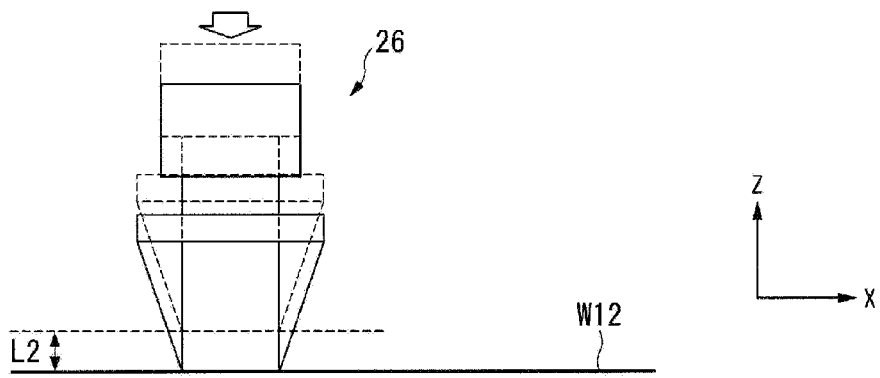
FIG. 8 is a view illustrating an example of the motion of a hand in the calibration processing according to the present embodiment.

FIG. 8 is a view illustrating the example of the motion of the hand 26 in the calibration processing according to the present embodiment.

In FIG. 8, the upper side and the right side indicate the Z direction and the X direction, respectively. The hand 26 represented by a dashed line shows that the hand is separated by the second distance L2 in the Z direction from the object W12 (FIG. 7, Step S104). The surface of the object W12 is on the XY plane. The hand 26 represented by a solid line shows that the terminal point (tip in this example) of the hand 26 comes into contact with the object W12 (FIG. 7, Step S107). A downward arrow shown right above the hand 26 shows that the hand 26 is moved from a position represented by a dashed line to a position represented by a solid line. That is, FIG. 8 illustrates that the hand 26 is moved in the Z direction and a reference point of a Z coordinate is determined with a position where the hand has come into contact with the object W12 (FIG. 7, Step S109).

Figure 9:
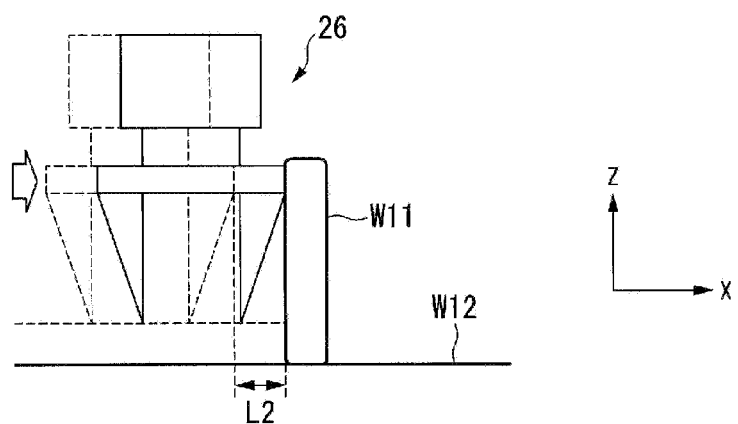
FIG. 9 is a view illustrating another example of the motion of the hand in the calibration processing according to the present embodiment.

FIG. 9 is a view illustrating another example of the motion of the hand 26 in the calibration processing according to the present embodiment.

In this example, a case where the target position is set on a side surface of the object W11 and the hand 26 is actuated in the X direction in Step S111 (FIG. 7) to determine a reference point of an X coordinate is illustrated. The hand 26 represented by a dashed line shows that the hand is separated by the second distance L2 in the X direction from the object W11 arranged so that a longitudinal direction thereof becomes the Z direction. The hand 26 represented by a solid line shows that the terminal point (side surface in this example) of the hand 26 comes into contact with the object W11. At this position, the calibration of the X coordinate of the terminal point of the hand 26 is performed (FIG. 7, Step S109). A rightward arrow shown on a left side surface of the hand 26 shows that the hand 26 is moved from a position represented by a dashed line to a position represented by a solid line. That is, the hand 26 is moved in the X direction, and the reference point of the X coordinate is determined with a position where the hand has come into contact with the object W11.

Although the example illustrated in FIG. 9 illustrates a case where the orientation of the hand 26 is the same as that of the example illustrated in FIG. 8, the invention is not limited thereto. The orientation of the hand 26 may be changed as will be described next, and after this change, the hand 26 may be moved in the same direction as the direction before the change.

Figure 10:
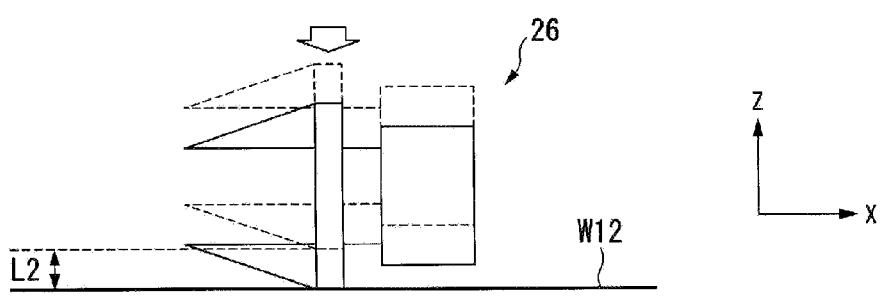
FIG. 10 is a view illustrating still another example of the motion of the hand in the calibration processing according to the present embodiment.

FIG. 10 is a view illustrating still another example of the motion of the hand 26 in the calibration processing according to the present embodiment.

In this example, a case where the target position is set on a front surface of the object W12 and the reference point of the X coordinate before the orientation of the hand 26 is changed is determined is illustrated. The hand 26 represented by a dashed line shows that the orientation of the hand is changed from the Z direction to the X direction in Step S111 (FIG. 7) and the hand is separated by the second distance L2 in the Z direction from the front surface of the object W12. The hand 26 represented by a solid line shows that the terminal point (side surface in this example) of the hand 26 comes into contact with the object W12. At this position, the calibration of the X coordinate of the terminal point of the hand 26 is performed (FIG. 7, Step S109).

A downward arrow shown on an upper side surface of the hand 26 shows that the hand 26 is moved from a position represented by a dashed line to a position represented by a solid line. That is, FIG. 10 illustrates that the hand 26 is moved in the Z direction (after change) and the reference point of the Z coordinate (after change) is determined with a position where the hand has come into contact with the object W12. The Z coordinate after this change is equivalent to the X coordinate before the change. Even when a region where the working unit 21 is movable is limited depending on a work environment (such as when objects other than a predetermined object are arranged or the like), three-dimensional calibration can be performed.

Although FIGS. 9 and 10 illustrate a case where the reference point of the X coordinate is determined, the reference point of the Y coordinate may be determined with a point where the hand 26 is moved in the Y direction and brought into contact with an object or the hand is moved in the Z direction and brought into contact with the object after the Y direction (before change) is changed to the Z direction (after change).

In the present embodiment, the terminal point of the working unit 21 is made to approach an object, using the visual servo as described above, and is then brought into contact with the object, using the force control, so that precise calibration can be realized and the calibration can be simply performed.

Next, the effects of the calibration according to the present embodiment and the effects of the related-art calibration will be compared. The calibration using the calibration processing according to the present embodiment is referred to as simple calibration, and the manual calibration as in the related art is referred to as precision calibration.

Figures 11, 12:
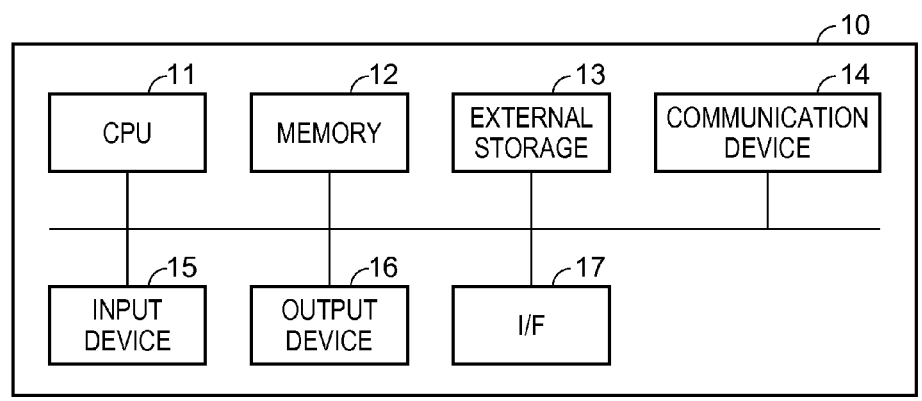
FIG. 11 illustrates a comparative example of simple calibration and precision calibration.
FIG. 12 is a view illustrating another example of a functional configuration of a robot control device according to the present embodiment.

FIG. 11 illustrates a comparative example of the simple calibration and the precision calibration.

The respective row shows the calibration precision and working hour. The working hour is time taken for the calibration and includes time when robot calibration and vision calibration are performed. The respective columns show the simple calibration and the precision calibration. In this example, it should be noted that, in the simple calibration, the working unit 21 is formed of an arm having a flexible structure with a relatively low rigidity and the number of reference points where the calibration is performed is two. In contrast, in the precision calibration, the working unit 21 is formed of a high-rigidity arm and the number of reference points to be used in the calibration is six.

In the simple calibration, the calibration precision is within ±2 mm, and the working hours total about 20 minutes. In the precision calibration, the calibration precision is within ±0.2 mm, and the working hours total about 4 hours.

That is, in the precision calibration, high precision is obtained, but the required working hours are long. Thus, the precision calibration is not realistic when the work environment changes frequently. In contrast, in the simple calibration, the precision that can withstand practical use is obtained, and the working hours can be markedly reduced. In the example illustrated in FIG. 11, the precision in the simple calibration is apparently lower than that in the precision calibration, but depends on the surface roughness of an object to be brought into contact with the terminal point. That is, even in the simple calibration, precision can be made to be high by using an object having a smaller surface roughness or increasing the number of reference points.

The configuration of the above-described robot system 1 describes the characteristics of the present embodiment, and is not limited thereto. The robot control device 10 may be constituted of a computer.

FIG. 12 is a view illustrating another example of the functional configuration of the robot control device 10 according to the present embodiment.

The robot control device 10 is configured to include a central processing unit (CPU) 11, the memory 12, an external storage 13, a communication device 14, an input device 15, an output device 16, and an interface (I/F) 17.

The CPU 11 performs computation related to the above-described processing. The memory 12 includes a read only memory (ROM) that is a nonvolatile storage, and a random access memory (RAM) that is a volatile storage. The communication device 14 communicates with the robot 20. The input device 15 is a device that receives user's operation and inputs an operation input signal according to the received operation, for example, from a mouse, a keyboard, or the like. The output device 16 is a device that outputs image data in a visually recognizable manner, for example, as a display or the like. The I/F 17 is connected to other devices, and inputs or outputs data. For example, I/F 17 inputs image data, for example from the imaging device 30.

The above-described respective functional parts, for example, are realized when the CPU 11 reads and executes predetermined programs stored in the memory 12. In addition, the predetermined programs, for example, may be installed in advance in the memory 12, or may be downloaded and installed or updated via the communication device 14 from networks.

Although the robot control device 10 and the robot 20 may be configured separately from each other as described above, the robot 20 with which the robot control device is integrated may be configured.

Additionally, although the imaging device 30 may be separated from the robot control device 10 or the robot 20 as described above, the imaging device may be integrated with the robot control device 10 or the robot 20.

Additionally, in the present embodiment, the double-arm robot including the two working units 21 is illustrated as an example of the robot 20. However, a single arm robot having one working unit 21 may be adopted or a robot having three or more working units 21 may be adopted. Additionally, the robot 20 may be a scalar robot, or may be a vertical articulated robot.

Additionally, the robot 20 may include, for example, operable leg portions, instead of the casters 27, as members that make movement possible. The robot 20 may be constituted as, for example, a walking robot including the leg portions and the robot control device 10 may control the motion of the leg portions. Here, required conditions for control related to movement are simplified by performing the control of starting the visual servo on the basis of the error of installation of the robot and the error resulting from the rigidity of the above-mentioned robot or by bringing an object into contact with one point of the working unit 21 and determining a position where one point has come into contact with the object as a reference point of one point of the working unit 21. For example, reducing the precision of the positions of the leg portions, the precision of the rotating speed of the wheel, or the like is permitted. Therefore, costs related to the manufacture, inspection, or the like of the robot 20 can be reduced.

Although the embodiment of the invention has been described above in detail with reference to the drawings, specific configuration is not limited to the embodiment, and design or the like that does not depart from the scope of the invention is also included.

The functional configuration of the above-described robot system 1 is classified according to main processing contents in order to make the configuration of the robot system 1 easily understood. The present invention is not limited by the classification methods or names of constituent elements. The configuration of the robot system 1 can also be classified into many more constituent elements according to the contents of processing. Additionally, one constituent element can also be classified so as to execute much more processing. Additionally, the processing of each constituent element may be executed by a single piece of hardware, or may be executed by a plurality of kinds of hardware.

Additionally, the sharing of the functions and processing of the robot control device 10 and a robot 20 is not limited to the illustrated example. For example, at least some functions of the robot control device 10 may be included in the robot 20 or may be realized by the robot 20. Additionally, for example, at least some functions of the robot 20 may be included in the robot control device 10 or may be realized by the robot control device 10.

Additionally, the respective processing units of the above-described flowchart are divided according to the main processing contents in order to make the processing of the robot control device 10 easily understood. The present invention is not limited by the division methods or names of the processing units. The processing of the robot control device 10 can also be divided into many more processing units according to the contents of processing. Additionally, one processing unit can also be divided so as to include much more processing.

Although the invention has been described above using the embodiment, the technical scope of the invention is not limited to the scope described in the above embodiment. It is apparent to those skilled in the art that it is possible to make various changes or improvements to the above embodiment. Additionally, it is apparent from the statement of the appended claims that forms in which such changes or improvements are made can also be included in the technical scope of the invention.

The entire disclosure of Japanese Patent Application No. 2013-226556, filed Oct. 31, 2013 is expressly incorporated by reference herein.

What is claimed is:

1. A robot system configured to operate in a work environment, the robot system comprising:
   a robot having an arm and an actuator; and
   a robot control device, wherein the robot control device includes:
      an image acquisition unit that acquires an image including an object, and
      a motion controller configured to (i) control the robot using a first command input that is not received from a visual servo and (ii) control a start timing at which control of the robot switches to the visual servo, wherein switching to the visual servo includes controlling the robot using a second command input received from the visual servo instead of the first command input, and wherein the motion controller is configured to determine the start timing at which the control of the robot switches to the visual servo in accordance with an installation error caused by movement of the robot.

2. The robot system according to claim 1,
Wherein, to control the start timing, the motion controller starts the visual servo in response to a determination that a distance between a terminal point of a working unit of the robot and the object is from 2 mm to 300 mm.

3. The robot system according to claim 1, wherein the visual servo is a control that makes the image acquisition unit image the object multiple times while the robot moves from a first posture to a second posture that is different from the first posture.

4. The robot system according to claim 1, wherein, to control the start timing of the visual servo, the motion controller is further configured to determine the start timing further based on whether at least one of an illuminance of a work environment in which the object is present and reflectivity of an object indicate an error in the work environment.

5. The robot system according to claim 1, wherein:
the robot includes (i) at least one caster configured to allow movement of the robot when the robot is in a first, moveable configuration and (ii) at least one adjustment foot configured to maintain the robot in a second, fixed configuration, wherein the robot is adjustable between the first, moveable configuration and the second, fixed configuration; and
the installation error corresponds to an error caused by movement of the robot in the first, moveable configuration.

6. The robot system according to claim 1, wherein:
to control the start timing of the visual servo, the motion controller is configured to switch the control of the robot to the visual servo in response to a determination that a distance between a terminal point of a working unit of the robot and the object is between a first predetermined distance and a second predetermined distance; and
wherein at least one of the first distance and the second distance is determined in accordance with the installation error.

* * * * *